United States Patent
Eldon

(10) Patent No.: US 7,492,891 B2
(45) Date of Patent: Feb. 17, 2009

(54) MOBILE ELECTRONIC DEVICE HAVING RELOCATABLE DISPLAY ELEMENT

(75) Inventor: James Eldon, Fleet (GB)

(73) Assignee: Nokia Corporation, Espoo (FI)

( * ) Notice: Subject to any disclaimer, the term of this patent is extended or adjusted under 35 U.S.C. 154(b) by 739 days.

(21) Appl. No.: 11/083,065

(22) Filed: Mar. 3, 2005

(65) Prior Publication Data

US 2006/0198513 A1    Sep. 7, 2006

(51) Int. Cl.
*H04M 1/00*    (2006.01)

(52) U.S. Cl. ............... 379/433.12; 455/575.4

(58) Field of Classification Search ........... 379/433.12, 379/433.13, 433.11, 433.01, 433.04; 455/575.3, 455/575.4, 575.1, 90.3, 550.1; 345/905; 361/679, 681, 686
See application file for complete search history.

(56) References Cited

U.S. PATENT DOCUMENTS

| | | | |
|---|---|---|---|
| 5,278,779 A * | 1/1994 | Conway et al. | 361/680 |
| 6,256,017 B1 * | 7/2001 | Bullister | 345/168 |
| 2001/0030850 A1 * | 10/2001 | Ditzik | 361/683 |
| 2003/0064688 A1 | 4/2003 | Mizuta et al. | |
| 2003/0224831 A1 | 12/2003 | Engstrom et al. | |
| 2005/0014538 A1 | 1/2005 | Hyun et al. | |
| 2005/0026658 A1 | 2/2005 | Soejima | |

* cited by examiner

*Primary Examiner*—Curtis Kuntz
*Assistant Examiner*—Phylesha Dabney
(74) *Attorney, Agent, or Firm*—Ware, Fressola, Van Der Sluys & Adolphson LLP

(57) ABSTRACT

A mobile electronic device includes a first housing part, a second housing part, and a hinge element connecting the first housing part and the second housing part in a foldable manner; the first housing part, the second housing part and the hinge element together form a housing, wherein the first housing part and the second housing part can assume the following positions: a closed position, wherein the first housing part and the second housing part are closed and facing each other; an open position, wherein the first housing part and the second housing part are folded apart forming an angle of approximately 180° in relation to each other; a display element relocatably supported on the housing in the open position such that the display element can be located on either the first housing part, the second housing part or on the hinge element.

9 Claims, 5 Drawing Sheets

MOBILE ELECTRONIC DEVICE HAVING RELOCATABLE DISPLAY ELEMENT

BACKGROUND OF THE INVENTION

1. Technical Field

The present invention relates to a new slide property of display elements in mobile electronic devices, particularly mobile phones. This feature combines the advantages of flip-type/foldable phones and landscape type phones.

2. Discussion of Related Art

Mobile phones of the so-called flip-type, also known as foldable or clamshell phones, have become rather popular recently. There are certain advantages associated with these phones. The overall area or footprint, in the closed position, is reduced compared to conventional "brick type" or monoblock phones. Also, the display is protected against scratching and the like in the closed position, as it is not exposed, but located on the inside of the housing parts folded together. In the folded open position these phones can provide a larger area for arranging control elements or a big display compared to conventional monoblock phones. Also the distance between microphone and speaker is usually larger than with brick type phones, which can help in enhancing the speech quality, as it usually is better suited for positioning microphone and speaker in the close vicinity of the mouth and ear of a user than in conventional phones.

Other types or form factors of mobile phones have become widely used as well. Particularly in the new gaming consoles, gaming enabled mobile phones like the Nokia® N-Gage™, the landscape form factor is used. This provides the possibility to position the display in the center of the respective device, whereas the control elements, i.e. a keypad, a 4-way rocker key and the like can be positioned on the left and right sides of the housing. In this manner the user is enabled to hold the device in both hands and simultaneously operate for example the 4-way rocker key with the right hand and the other controls with the left hand.

This concept is also applicable to phones having a full keyboard, like in the Nokia cell phone 6810/6820, for giving the user the possibility to type emails, SMS or other messages more easily. While this form factor is well suited for gaming and writing messages it is not as comfortable for speech connections as other (portrait) mobile phones, as such landscape phones must be held in a position rotated 90° in relation to the gaming/writing position. Among other things this entails certain problems associated with the location/orientation of the standard phone keypad or at least the respective key labels, which may cause a certain discomfort for a user. Furthermore this form factor is not suitable for single-handed operation of the respective device, e.g. browsing through the phonebook or reading incoming messages, whereas conventional monoblock and foldable phones do not or at least not suitably enable a landscape usage mode.

The object of the present invention is therefore to provide a variable operating surface for mobile electronic devices or mobile phones combining the advantages of the above mentioned foldable phones and the landscape type phones.

SUMMARY OF THE INVENTION

According to an aspect of the present invention a mobile electronic device is provided, comprising a first housing part, a second housing part and a hinge element connecting the first and second housing parts in a foldable manner. The first and second housing parts and the hinge element form a housing, wherein the first and second housing parts can assume at least the two following positions: a closed position, wherein the first and second housing parts are closed and facing each other, and an open position, wherein the first and second housing parts are folded apart forming an angle of approximately 180° in relation to each other, or in other words are facing in the same direction. The mobile electronic device may further comprise a display element that is relocatably supported on the housing such that it can—in the open position—be located on either of the housing parts or on the hinge element.

In a device according to the invention the display element can be located in the center of the device when both housing parts are folded open. In this manner a landscape mode can be presented to the user, while the device of the invention otherwise behaves similar to a conventional foldable phone. The advantage of this arrangement relies on the fact that the device can be used both in a portrait mode, for making calls or just reading incoming messages, i.e. single-handed operation, as well as in a landscape mode, for playing games, watching video clips or typing text messages, i.e. a two-handed operation. While the landscape mode can be used for demanding tasks as mentioned before, such a mobile electronic device can still be stored and carried in the closed position, which requires less room and provides for a better protection of both display surface and control elements. A mobile electronic device according to the invention thus combines the advantages of foldable phones with that of landscape type phones in a single device.

In an exemplary embodiment the first and second housing parts can assume one further position, wherein the first and second housing parts are folded apart forming an angle of less than 180° in relation to each other. This enables to assume a configuration being similar to that of conventional foldable phones, where the housing parts are slightly inclined, e.g. in an angle of about 22°. Such arrangement is best suited for making voice calls, wherein microphone and speaker can be positioned near the mouth and ear of the user in an optimum manner. As the display element can be supported such that it is prohibited from being displaced in this configuration, because of the inclined surfaces, the mobile electronic device can be implemented as behaving like a conventional foldable phone.

In an exemplary embodiment control elements are arranged on at least one of the housing parts, which control elements are hidden under the display element when it is located on the respective housing part, and which are exposed to be operable when the display element is located at least partly remote from the housing part. This enables special keys or other control elements (rocker keys, joysticks) to be exposed for operation only in either the landscape or the portrait mode, while keys not being used in a specific configuration can be hidden. User comfort can thus be increased, as only those keys are operable that are actually functional in a mode. This can be achieved by having the display element either cover part or all of only one housing part (in closed or portrait mode), or cover the hinge element and a partial section of the housing part (in open landscape mode). Also, this offers the possibility to locate the display element completely on just one of the two housing parts. In other words, two different (foldable) phone configurations can thus be offered to a user, with different key configurations for example.

In an exemplary embodiment the mobile electronic device includes a camera located in the housing, and the display element is provided with an opening for the camera. As cameras are very common in mobile phones of today this is advantageous. The display element can be implemented such that the camera will be exposed only in a selected mode, e.g.

landscape/portrait mode, while it is hidden under the display element in the other mode, for protection against scratching and dirt. Further, two cameras can be provided wherein only one is exposed by the display element at a time.

In an exemplary embodiment the housing comprises guiding rails in which the display element is supported. Guiding rails provide a good mechanical solution for making the display element relocatable. Also this enables implementations which will become apparent from the detailed description and the figures.

In an exemplary embodiment the hinge element protrudes over the surface formed by the first and second housing parts in the open position, and the display element comprises corresponding indentations in which the protrusions fit when the display element is located on the hinge element. Depending on the type of hinge element it may not be possible to prevent it from having protrusions over the sliding surface. In that case it is advantageous to provide corresponding indentations for receiving the protrusions. It can further be utilized for providing a better lock of the display element in the landscape mode. Thus it may even be advantageous to deliberately provide such protrusions even if the hinge element could be constructed without them otherwise.

In an exemplary embodiment the hinge element comprises two hinges. In this manner two conventional hinges can be used, which is simple but still provides good mechanical properties. Such a device can also be manufactured at low cost.

In an exemplary embodiment the hinge element comprises a bendable element. Implementing the hinge element in this way enables to use a so-called "wrap-around" type hinge, which is a very flexible kind of hinge, and can be designed without having any protrusions, i.e. providing a smooth surface.

In an exemplary embodiment the display element has the form of a sleeve encapsulating the housing. This provides good mechanical stability and improved protection of the housing as it is fully enclosed by the display element. Also in this manner guide rails or the like are not strictly required, or at least rather simple guides can be used.

In an exemplary embodiment the display element covers only one face of the housing. This of course enables the thickness of a device to be limited according to the invention. However this will require the use of guiding rails or similar means, as the display element could be detached from the housing otherwise, compared with the previous embodiment. As will be described in conjunction with the figures, this feature can advantageously be utilized in connection for example with protruding hinge elements and corresponding indentations.

BRIEF DESCRIPTION OF THE DRAWINGS

The invention will be more fully understood by referring to the attached drawings, which are provided as non-limiting illustrations of example embodiments of the invention, and wherein:

FIG. 6 shows an embodiment of the invention comprising a full QWERTY keyboard in the landscape mode.

DETAILED DESCRIPTION OF THE INVENTION

Figure 1:
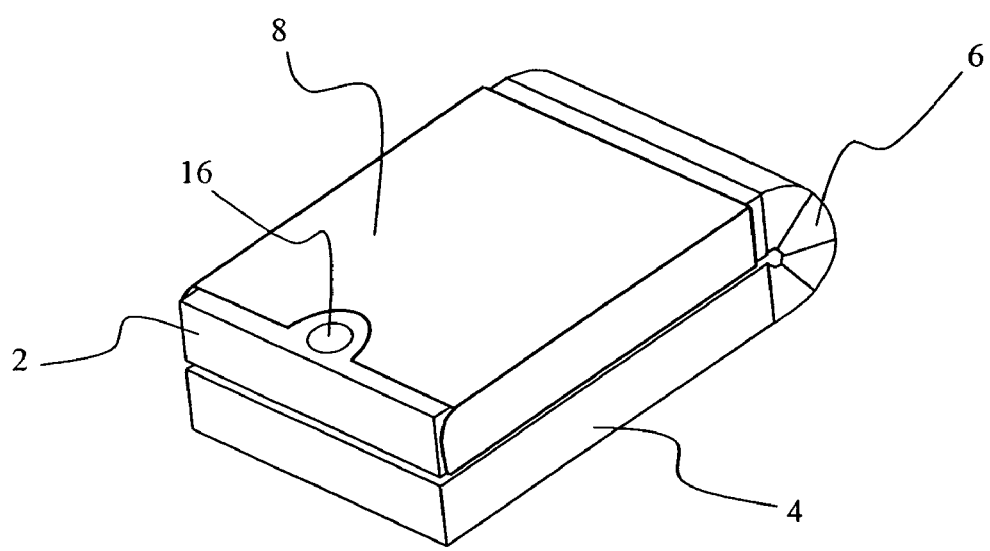
FIG. 1 shows a mobile phone according to an embodiment of the present invention in the closed configuration.

In FIG. 1 an embodiment of the present invention is shown. A mobile phone according to this embodiment is constituted by a first housing part 2 and a second housing part 4, wherein the two parts 2 and 4 are connected by a hinge element 6. These three components form a housing. Being connected in this manner by the hinge element 6 the housing parts 2 and 4 can be folded into a closed configuration of the mobile phone as depicted here. An element 8 comprising a display is arranged on the first housing part 2, such that the display (not visible here) will be located on the first housing part 2 folded upon the second housing part 4, with the display itself being "sandwiched" between the two housing parts. This display element 8 may, as depicted here, be implemented like a matchbox sleeve, i.e. encapsulating the housing on four sides, wherein the hinge side and the one opposed to the hinge element are not encapsulated. The display in this configuration abuts on the second housing part 4, or in other words it is located between the two housing parts 2 and 4 when the phone is folded into the closed configuration. This display element 8 may for example, as depicted here, be in the form of the outer case part of a matchbox, i.e. substantially flat and rectangular, wherein two opposing short sides are open.

However it should be noted that the present invention is not limited to this particular embodiment of the display element 8. Particularly it is not necessary that this display element 8 encapsulates the housing in the manner shown here. For example the back side of the element, i.e. the upper face in this figure, can be omitted, if suitable other means are used for supporting the display element 8 on the housing. Such means may also be used with a "full" sleeve type display element, although they are then not strictly required.

Another possible detail is shown in FIG. 1 as well. For a mobile phone being provided with a camera 16 the display element 8 can suitably be provided with a corresponding opening for exposing the camera lens. The opening can be implemented as depicted here, i.e. exposing the camera 16 in the closed or portrait position (shown in later figures). However it is also possible to provide the opening such that the camera 16 will be obstructed in these positions and only be exposed in the landscape mode. It is even within the concept of the present invention to have two cameras for the two positions (portrait/closed and landscape), wherein only one is operable at a time.

Figure 5:
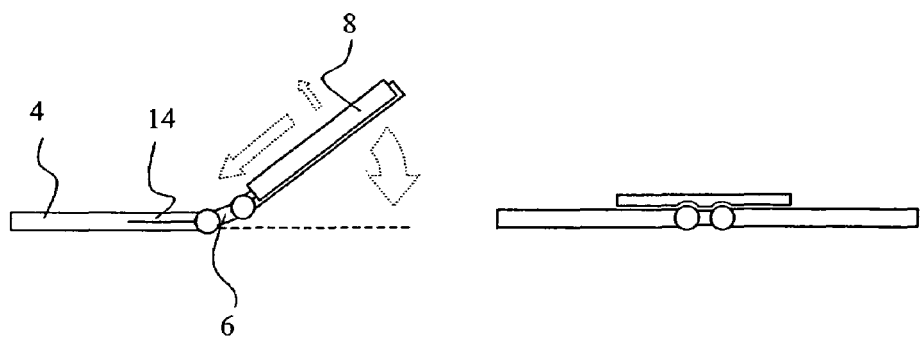
FIG. 5 shows an alternative embodiment of the present invention.

Another possible variant for the display element 8 can be taken from FIG. 5. An important detail which can be seen better in the following figures is that, because of the finite thickness of the display itself (e.g. 6 mm), the hinge element 6 must be chosen such that the two housing parts 2 and 4 themselves do not abut on each other in the closed configuration. Instead they must be arranged in a parallel fashion leaving enough clearance between them to accommodate the display element 8. Thus a special kind of hinge must be used, for example of the so-called "wrap-around" type, i.e. as an elastic bendable element. Other hinges fulfilling this prerequisite are also suitable for a mobile phone according to the present invention, for example a combination of two conventional hinges. As will emerge more clearly later on the hinge element 8 should, additionally to having the characteristic just described, not protrude much over the surfaces of the two housing parts 2 and 4 when in an open configuration wherein these surfaces are aligned in a parallel fashion. In one preferred variant it should not protrude at all but be flush with the surfaces; however there are certain embodiments where this is not be possible or necessary.

In every circumstance the surfaces of the housing parts 2 and 4 must, in the landscape mode, be aligned such they are substantially parallel to each other (in other words assuming an angle of 180° in relation to each other), to allow the display element 8 to smoothly slide up and down or along. The housing parts will in most embodiments have a substantially cuboidal, i.e. flat and rectangular, form with even surfaces on which the keypad and the display element are arranged. However the only pre-requisite is that the display element can slide along smoothly, therefore it is not strictly required for the inner surfaces of the housing parts to be even.

It should be noted that, although the figures only show the display element arranged such that the display itself becomes sandwiched between the housing parts in the closed position, this is not a limitation of the invention. There may be special circumstances where it might even be advantageous to provide the display element with a display or an additional display facing upward in the closed position. For example this can be used to show the time, or incoming messages or other information that should be visible even in the closed position.

The hinge element in a device according to the present invention is not necessarily restricted to an opening angle of 180°. It is also possible to provide for an angle of up to 360°, i.e. to enable the device to provide two different closed positions, wherein different faces of the housing parts are folded together or exposed, respectively.

Figure 2:
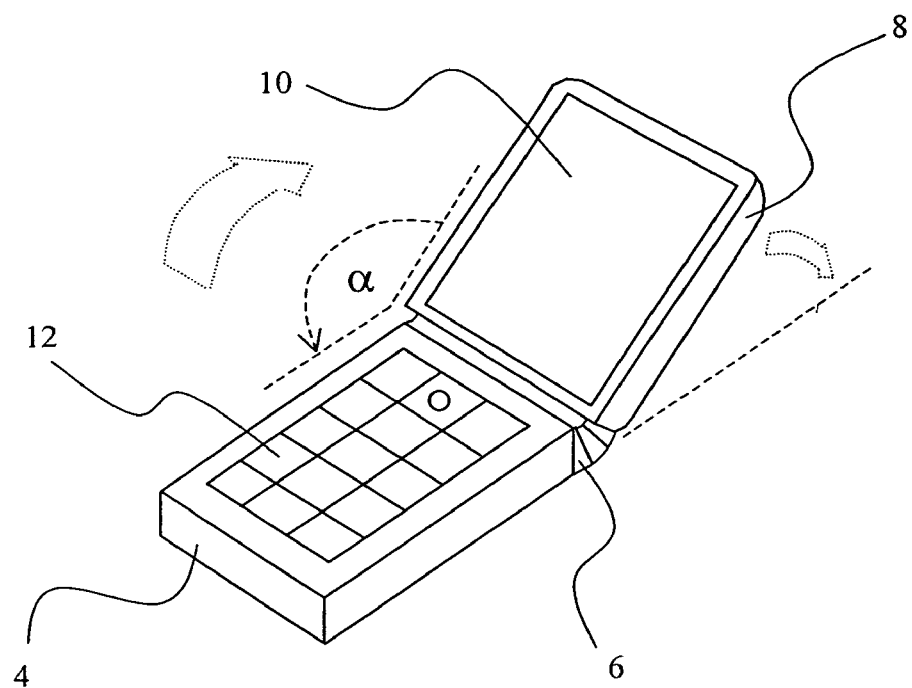
FIG. 2 shows the mobile phone of FIG. 1 in an open position in the portrait/foldable phone configuration.

FIG. 2 shows the mobile phone of FIG. 1 in an open position, i.e. in the portrait/foldable phone configuration. The housing parts 2 and 4 are arranged with an angle α between them of about 158°, i.e. in a conventional open configuration for a foldable phone. The hinge element 6 in a device as depicted here thus provides at least three different positions:
(a) a closed position (as depicted in FIG. 1), wherein both housing parts 2, 4 are arranged substantially parallel and above one another, in other words folded together, and the hinge element 6 being located on one side of the housing parts;
(b) an open landscape mode position (as will be seen from FIG. 3), wherein both housing parts 2, 4 are arranged substantially parallel, i.e. folded apart or open, with the hinge element 6 located between them, and wherein the display element 8 is located on/encapsulates the hinge element; and
(c) an open portrait mode position (as depicted in FIG. 2), wherein the housing parts 2, 4 are arranged such that their surfaces accommodate an angle α of e.g. 158°. This angle α will usually be somewhere in the range of 90° to 179°, or more specifically in the range of about 135° to 160°.

The three positions are primarily suited for the following purposes:
(a) closed position for storing and carrying the mobile phone;
(b) landscape mode for playing games, writing messages and the like, wherein the display element 8 is slid over the hinge element 6 to expose specific control elements on the housing part 2 and expose a sub-set of the control elements located on housing part 4 for being operated by a user, or also for taking pictures in landscape mode with a camera of the device;
(c) a portrait mode for taking/making calls, browsing through received messages, or taking photos with a camera of the mobile phone in portrait mode.

With the present invention the advantages of both foldable phones and landscape phones (or similar mobile electronic devices as well) can be combined in a single device. While the foldable housing provides for a small footprint and protection for the sensitive display surface when carrying the phone a mobile electronic device according to the present invention also provides the enhanced landscape position which is far better suited for typing messages and playing games. Also the conventional portrait mode is possible with such a phone, which is more comfortable for making calls or performing other single-handed operations, e.g. for just browsing through the phonebook or reading received messages.

Another task that may be performed more easily in landscape configuration is e.g. editing/watching video clips. Different aspect ratios of the display can be provided in a device according to the invention, e.g. 3:2, 3:4 or 16:9, depending on the preferred use.

The user gains the advantage of being offered a comfortable and optimum two-handed operation mode for demanding tasks such as gaming, typing long text messages, video editing and browsing. In the device according to the invention this is combined with the benefit of a normal fold phone operation and the corresponding compact storage.

Figure 3:
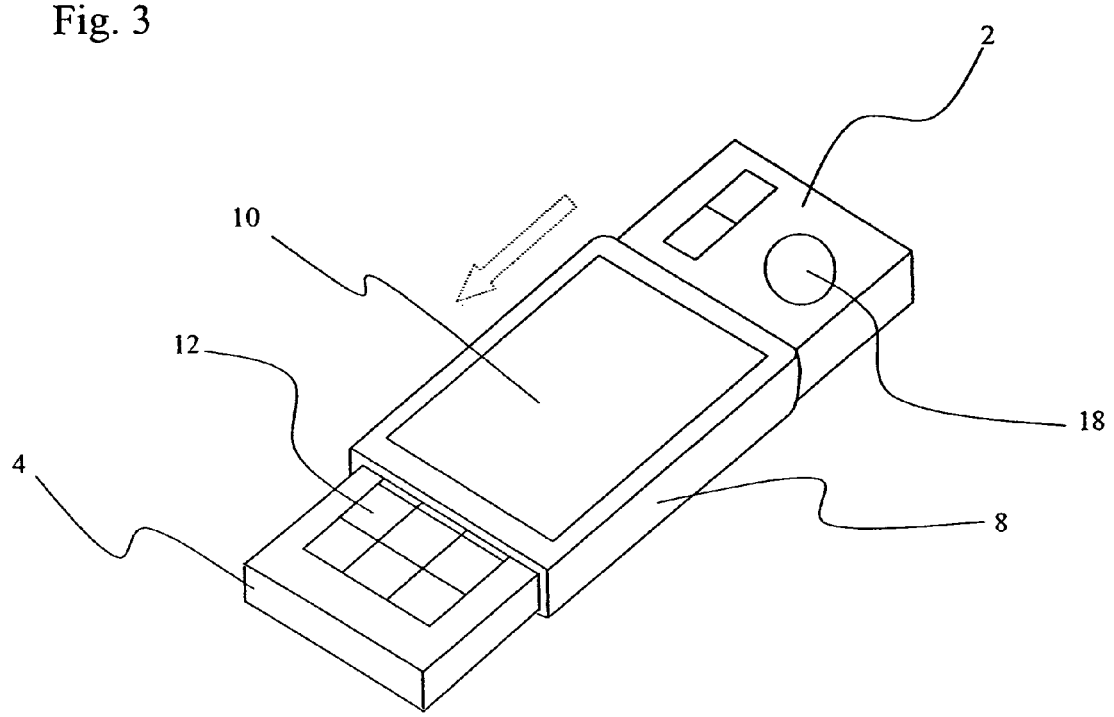
FIG. 3 shows the mobile phone of FIGS. 1 and 2 in an open position in the landscape configuration.

FIG. 3 shows the mobile phone of FIGS. 1 and 2 in an open position in the landscape configuration. Such a configuration is best suited for playing games on the phone, or for writing messages, possibly with a QWERTY keyboard provided on the phone (better to be seen in FIG. 6). In this orientation or mode the display element 8 can be slid over the hinge element 6. This provides two major advantages. First the display 10 becomes positioned in the center of the folded open phone which is just natural and convenient to a user, with control elements being positioned on the sides suitably for two-handed operation. Second this enables a specific configuration of control elements to be provided as well. On the one hand the display element 8 slid sideways over the hinge element 6 will expose certain keys that are particularly assigned to the landscape mode of the phone. These may include camera handling controls for taking pictures in landscape mode, special gaming controls like a 4-way rocker key or joystick-like element 18, but also one half of a "complete" keyboard for writing messages and the like. However it should be noted that these are just examples of specific control elements and respective configurations that can be provided. These specific keys or control elements will then be hidden and protected while the phone is in a mode where they are not used, like special gaming controls as the rocker key 18 which will not be used while making voice calls.

On the other hand the displaced display element 8 will obstruct or hide a part of the control elements being provided on the second housing part 4. In this manner keys or the like which are not to be used in the landscape mode can be hidden, for protection and to prevent accidental operation thereof. The latter provides for an improved comfort to the user, as he is not confused when operating a key which may not be functional in a specific mode. At the same time the display element 8 will still leave a sub-set of the control elements exposed for operation. This sub-set can be specifically selected in a mobile electronic device according to the present invention, e.g. by choosing the form of the display element such that is obstructs/exposes the desired sets of control elements or keys. For example for gaming purposes only a limited number of control keys can be exposed, preventing a user from being confused by keys being visible which are not actually used or even non-functional. For writing messages it can be arranged such that e.g. the keys for taking/ending calls or the rocker key for navigating the menus will be obstructed when the phone is in the landscape mode. These are but few examples for embodying the present invention, to specifically obstruct controls which are not used in a certain mode while at the same time exposing controls that are only used in that particular mode.

Figure 4:
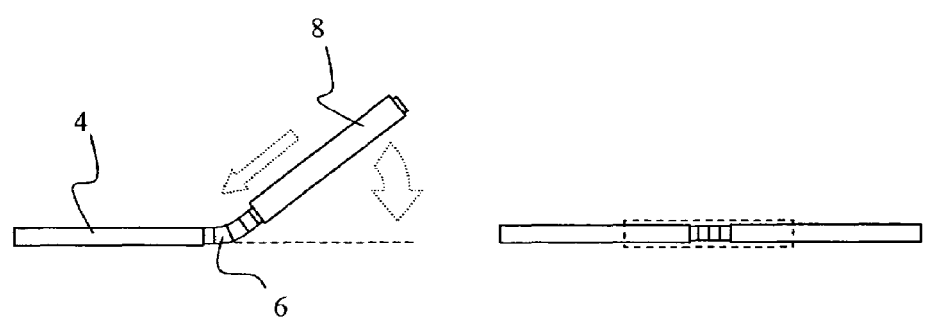
FIG. 4 shows the mobile phone of FIG. 1 in a side view.
Figure 4:
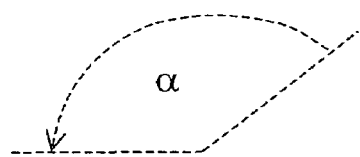

In FIGS. 4 and 5 two embodiments of the present invention are shown in a side view. FIG. 4 illustrates a mobile phone as that of FIG. 1 with a hinge element 8 of the "wrap around" type, and wherein the display element 8 completely encloses the first housing part 2, i.e. is provided with a back wall. From the portrait position where the surfaces are oriented with an angle of e.g. α=158° the phone can be folded completely open as indicated by the dotted arrow. The display element 8 can then be slid sideways to cover/encapsulate the hinge element 6, and will arrive at the configuration depicted on the right side of the figure. In this embodiment, and as illustrated here, it is preferred that the hinge element 6 does not protrude above the surfaces of the housing elements 2 and 4, in order to enable the display element 8 to slide along smoothly. As the display element 8 fully encloses the housing in this embodiment it could otherwise have negative effects on the stability of the phone. If the hinge element 6 did protrude the display element 8 would have to be at least partly flexible to slide over the hinge element 6. This is of course undesirable, as the phone it its landscape position could suffer from a certain mechanical play.

Another variant is illustrated in FIG. 5. Here another type of hinge element 6 is used, in this case being constituted by two combined conventional hinges. Another difference shown in this figure relies on the fact that the display element 8 does not totally enclose the housing part 2, i.e. it is not provided with a back wall. Such a construction may e.g. be achieved by using side rails 14 in which the display element 8 can slide parallel to the housing parts 2 and 4. In that case the back wall is not necessary for providing a stable fit of the display element 8 on the housing. Furthermore the two hinges are shown here as protruding slightly above the surfaces of the housing elements 2 and 4.

In contrast to the previous embodiment this can be handled with the rail construction illustrated here. Corresponding indentations can be provided on the inside of the display element 8, fitting over the protrusions of the hinges. This is shown on the right side of this figure, wherein the side part of the display element 8 is cut away in order to illustrate how the indentations fit over the protrusions. As the display element 8 does not have a back wall here it is possible to provide some flexibility in the rails, in order to let the display element 8 slide smoothly and easily over the protrusions, i.e. giving it the flexibility to be slightly moved perpendicular to the surfaces of the housing parts 2 and 4 (indicated by the small arrow pointing away from the face of the housing part). The display element 8 itself does not need to provide flexibility, e.g. through a flexible material. Thus it can be locked firmly to the housing parts 2 and 4 snapping into the protrusions when it has reached the centered position, avoiding any undesired mechanical play.

In FIG. 6 a variant of a device according to the invention is illustrated, wherein a dual-function keyboard is provided. Depending on the orientation (i.e. landscape mode or portrait mode) the labels on the keys corresponding to the respective functions are readable. That is, in the landscape mode a full QWERTY keyboard is visible to the user, while in the portrait mode he can easily read the number keys for dialling and the like. The present invention offers the possibility to expose only those keys by the sliding display element which are used in a respective position of the device. User comfort is thus greatly enhanced, as there are only those keys accessible at a time, which correspond to the desired functionality of the device. The user is not confused by keys that may not provide a function in a specific mode at all. That is, as an example either the gaming controls or the full keyboard, or the conventional ITU-T keypad.

The connections between the three main components, i.e. the two housing parts and the display element, can be achieved through conventional flexible or coax arrangements. While this is the preferred solution it is also possible to implement the concept of the present invention using cableless connections, i.e. infra-red or even radio frequency links.

The sliding mechanism can be selected from a number of known conventional sliding mechanisms, including rails, rail and ball bearings, rail and platelet, draw types, etc. It must ensure a firm encapsulation or hold in the open position to avoid mechanical play, and a good mechanical lock in the different positions of the electronic device of the invention. The slide mechanism also should ensure an easy transformation into the different modes of the device, e.g. such that the housing of the device will spring and lock into its landscape position when the foldable housing parts are opened flat. At least the transition into the two basic positions, i.e. closed and landscape position, should be spring-assisted. It is preferred that also the additional position corresponding to the conventional open position of the foldable phone with inclined surfaces of the housing parts is spring-locked and transition into this position is assisted by spring force. In other words, the transformation mechanism should have good automatic appeal as it springs and locks into the respective operating positions of the electronic device.

Depending on the height the display element will add, the hinge element must be implemented with enough clearance to accommodate or "sandwich" the display element when the housing parts are folded together/closed. Every hinge type providing such clearance can be used within the concept of the present invention, including a so-called "wrap-around" type bendable hinge or a double-hinge arrangement.

It should be noted that, although the present invention has been described mainly in connection with mobile phones, it can also be applied to any other similar electronic device like a PDA, a smartphone and the like.

The invention claimed is:

1. Mobile electronic device, comprising:
   a first housing part;
   a second housing part;
   a hinge element connecting said first housing part and said second housing part in a foldable manner;
   said first housing part, said second housing part and said hinge element forming a housing, wherein said first housing part and said second housing part can assume the following positions:
   a closed position, wherein said first housing part and said second housing part are closed and facing each other;
   an open position, wherein said first housing part and said second housing part are folded apart forming an angle of approximately 180° in relation to each other;
   a display element relocatably supported on said housing in said open position such that said display element can be located on either said first housing part, said second housing part or on said hinge element,
   and wherein said display element has a form of a sleeve encapsulating said housing.

2. Mobile electronic device according to claim 1, wherein said first housing part and said second housing part can assume one further position, wherein said first housing part and said second housing part are folded apart forming an angle of less than 180° in relation to each other.

3. Mobile electronic device according to claim 1, wherein control elements are arranged on at least one of said first housing part and said second housing part which control elements are hidden under said display element when it is located on a respective housing part, and which are exposed to be operable when said display element is located at least partly remote from said respective housing part.

4. Mobile electronic device according to claim 1, wherein said mobile electronic device comprises a camera located in said housing, and wherein said display element is provided with an opening for said camera.

5. Mobile electronic device according to claim 1, wherein said housing comprises guiding rails in which said display element is supported.

6. Mobile electronic device according to claim 1, wherein said hinge element protrudes with protrusions over a surface formed by said first housing part and said second housing part in the open position, and wherein said display element includes corresponding indentations in which said protrusions fit when said display element is located on said hinge element.

7. Mobile electronic device according to claim 1, wherein said hinge element comprises two hinges.

8. Mobile electronic device according to claim 1, wherein said hinge element comprises a bendable element.

9. Mobile electronic device according to claim 1, wherein said display element covers only one face of said housing.

* * * * *